United States Patent Office 3,114,604
Patented Dec. 17, 1963

3,114,604
PROCESS FOR RECOVERY OF BORON-
CONTAINING COMPOUNDS
Jawad H. Murib, St. Bernard, Ohio, assignor to National
Distillers and Chemical Corporation, New York, N.Y.,
a corporation of Virginia
No Drawing. Filed May 25, 1959, Ser. No. 815,756
3 Claims. (Cl. 23—204)

The present invention relates to a process for recovery of boron hydrides from gaseous mixtures thereof with substances such as hydrogen, aliphatic saturated hydrocarbons, inert gases, and hydrogen halides. More particularly, the invention relates to the recovery of diborane or chloroboranes from gaseous mixtures thereof with gases such as aliphatic saturated hydrocarbons and hydrogen halides and which may also contain inert gases such as hydrogen, nitrogen, and the like.

There are numerous occasions presenting the desirability of recovering boron hydrides, such as diborane, from gaseous mixtures containing same. For example, in pyrolytic processes for conversion of diborane to higher boranes, hydrogen is evolved as a by-product. In such a process, a portion of the diborane is not converted to the desired product and its recovery (for recycle) from the hydrogen stream requires expensive operating techniques, such as refrigeration and fractional condensation with liquid nitrogen cooling. In other methods, diborane-containing gaseous mixtures are treated with pyridine or tertiary amines that provide substantially non-volatile complexes of pyridine:$BH_3$ and liberation of the diborane is effected by treating the complex with a boron halide ethereate as, for example, as is illustrated by the following equation:

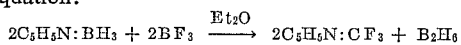

$$2C_5H_5N{:}BH_3 + 2BF_3 \xrightarrow{Et_2O} 2C_5H_5N{:}CF_3 + B_2H_6$$

However, as the $C_5H_5N{;}BF_3$ complex does not thermally dissociate, economical recovery of the reagents is precluded.

The primary object of the present invention is to provide an improved process for effective and substantially quantitative removal and recovery of boron hydrides, such as diborane, from gaseous mixtures containing same.

The process embodied herein comprises contacting a gaseous mixture containing a boron hydride with a dialkyl, diaryl, alkylaromatic or cyclic sulfides to selectively complex the boron hydride and recovery of the boron hydride by reacting the resulting complex with a metal halide (as described more fully hereinafter) that displaces the boron hydride from the complex. The invention further embodies the recovery, in substantially pure form for reuse, of the sulfide and metal halide from the resulting complex of the sulfide-metal halide. Thus, the reactions that are believed to occur in practice of the present invention are set forth by the following equations in which diborane is the boron hydride to be separated from a gaseous mixture containing same:

(1)    $\frac{1}{2}B_2H_6 + R_2S \rightleftarrows R_2S{:}BH_3$
(2)    $RS{:}BH_3 + MX_n \rightarrow R_2S{:}MX_n + \frac{1}{2}B_2H_6$
(3)    $R_2S{:}MX_n \rightleftarrows R_2S + MX_n$ wherein R is alkyl, aryl or alkyl aryl, and, preferably, alkyl groups containing 1 to 8 carbon atoms, M is an element from the group consisting of zinc, iron(II), cadmium, boron, aluminum, gallium, indium, thallium(III), and X is a halide (i.e., fluorine, chlorine, bromine or iodine); and n is the valence of the metal. In preferred embodiment, the invention is practiced with substances in which X is chlorine, M is zinc, or boron or aluminum, and R is a lower molecular weight alkyl group such as methyl, isobutyl, hexyl or a cyclic sulfur compound such as tetrahydrothiophene, etc. Specific examples of preferred substances include zinc chloride and boron chloride as the metal halides, and dimethyl sulfide as the complexing agent for the diborane.

In reference to the operational steps for carrying out the process, in a first step (1) the gaseous mixture from which the boron hydride is to be recovered is contacted with an amount of the sulfide substanitally equivalent to or in excess of the amount required to complex the boron hydride present in the gaseous mixture with the contact being effected at a temperature between the melting point of the sulfide and that at which dissociation of the resulting complex is not deleteriously excessive. Thus, and as a specific illustration utilizing dimethyl sulfide, the aforesaid step is carried out at a temperature of —83° C. (the melting point of the sulfide) up to about 25° C. In a second step (2), the boron hydride-sulfide complex from (1) is contacted with a metal halide (as aforedefined) in an amount at least substantially stoichiometrically sufficient to displace the boron hydride from the boron hydride-sulfide complex, such a step (2) being carried out at a temperature between the melting point of the boron hydride:sulfide complex and a temperature at which dissociation of said complex is not unduly excesisve. Thus, and for the embodiment wherein such a complex is obtained from dimethyl sulfide and diborane, i.e., $$[(CH_3)_2S{:}BH_3]$$

step (2) is carried out at from about —38° C. (the melting point of the complex) to about 25° C. The boron hydride, displaced from the complex thereof with the sulfide, can then be recovered, preferably by distillation. In a subsequent step, the components of the metal halide-sulfide complex can be recovered in substantially pure form and in substantially quantitative amount, suitable for recycle in the process, by heating the complex, such as from about room temperature (e.g., about 25° C.) up to about 250° C., and preferably from about 75 to about 200° C. whereupon dissociation occurs and the dissociated sulfide can be separated from the metal halide by distilling off the sulfide.

In order to further describe the invention, the following embodiments are set forth for purposes of illustration and not limitation.

Example I

A gaseous mixture (334 cc. at standard conditions) containing diborane and ethane (20%), having a vapor pressure of 239 mm. at —112° C. was contacted at room temperature with 697 cc. (gas at standard conditions) of dimethyl sulfide (vapor tension 177 mm. at 0° C.). The mixture was then passed through a trap maintained at —80° C. The liquid condensate exerted a vapor tension of 5 mm. at 0° C., as compared to a reported value of 4.6 mm. for $(CH_3)_2S{:}BH_3$ at 0° C. A 0.122-gram portion of the adduct (1.61 mmoles.) was refluxed with 5.3 grams of anhydrous zinc chloride. This mixture was then warmed to 50–70° C., and 15 cc. (0.675 mmole.) of diborane was obtained (as shown by its vapor tension of 226 mm. at —112° C. in contrast to 225 mm. for pure $B_2H_6$). Recovery of diborane amounted to 85% of that contained in the initial adduct. Heating of the resulting zinc chloride-dimethylsulfide complex at 90–100° C. under vacuum resulted in the liberation of 35.3 cc. (1.58 mmoles.) of dimethyl sulfide or 98% of that present in the borane sulfide adduct.

Example II

In this example, treatment of 0.67 mmole. of the dimethyl sulfide-borane complex, $(CH_3)_2S{:}BH_3$ with 3.3 mmoles. of boron chloride at room temperature liberated diborane with the formation of a solid adduct, $$(CH_3)_2S{:}BCl_3$$

of low volatility. The excess boron trichloride was removed from the liberated diborane by fractional condensation at −112° C. The presence of diborane as the non-condensable gas at this temperature was established by infrared analysis.

The process embodied herein results in numerous advantages as compared to recovery of diborane from mixtures thereof by heating complexes of the diborane to dissociate same. The method of the present invention provides for more complete recovery of the diborane, is not subject to occurrence of undesired irreversible thermal decomposition reactions and, in specific usage of the dimethyl sulfide complex, obviates the need for extremely fine fractionation. As aforedescribed, a particularly important and additional advantage is that practice of the present invention also provides for efficient recovery of the sulfide and metal halide in substantially quantitative amounts by simply heating the complex thereof whereby the components of the complex can be reused by recycle in the process.

What is claimed is:

1. A process for recovery of diborane from gaseous mixtures thereof containing an inert gas which comprises (1) contacting said mixture with an amount of a sulfide of the formula $R_2S$, wherein R is an alkyl group of from 1 to 8 carbon atoms, at least substantially equivalent to the amount required to selectively complex diborane in the gaseous mixture, said contact being carried out at a temperature of about −83° to 25° C.; (2) contacting the resulting complex of the sulfide and the diborane with zinc chloride to displace the diborane from said complex and to form a complex of the zinc chloride with the sulfide, said contact of the complex of the sulfide and the diborane being carried out with an amount of the zinc chloride sufficient to displace the diborane and at a temperature of about −38° to 25° C.; (3) recovering the diborane resulting from said displacement from the complex with the sulfide; and (4) heating said zinc chloride-sulfide complex to a temperature sufficient to dissociate said complex.

2. The process of claim 1 wherein the zinc chloride-sulfide complex is thermally dissociated by heating it at a temperature ranging from about 25° to 250° C.

3. The process of claim 2 wherein the zinc chloride recovered by said thermal dissociation is recycled for use in the displacement of diborane from the sulfide-diborane complex, and the sulfide recovered by said thermal dissociation is recycled for use in the formation of the sulfide-diborane complex.

References Cited in the file of this patent

UNITED STATES PATENTS 2,533,696     Schaeffer et al.            Dec. 12, 1950

OTHER REFERENCES

Mack et al.: "Textbook of Chemistry," Ginn and Company (1949), pages 410–425.

Burg et al.: "J. Am. Chem. Soc.," volume 76, pages 3307–3310, June 20, 1954.

Stone: "Quarterly Reviews," volume 9, pages 194–196 (1955).

Graham et al.: "Chemistry and Industry," pages 319, 320 (1956).

Graham et al.: "J. Inorg. Nuclear Chem.," volume 3, pages 164–177 (1956).